US012583050B2

(12) United States Patent (10) Patent No.: US 12,583,050 B2
Putnam et al. (45) Date of Patent: Mar. 24, 2026

(54) METHODS FOR OPERATING A PLASMA TORCH

(71) Applicant: The ESAB Group Inc., Annapolis Junction, MD (US)

(72) Inventors: Geoffrey H. Putnam, Charlestown, NH (US); Christopher Vincent Braudis, Sr., Canaan, NH (US)

(73) Assignee: The ESAB Group Inc., North Bethesda, MD (US)

( * ) Notice: Subject to any disclaimer, the term of this patent is extended or adjusted under 35 U.S.C. 154(b) by 1081 days.

(21) Appl. No.: 17/667,691

(22) Filed: Feb. 9, 2022

(65) Prior Publication Data

US 2023/0249277 A1 Aug. 10, 2023

(51) Int. Cl.
B23K 10/00 (2006.01)
B23K 9/095 (2006.01)
B23K 37/02 (2006.01)

(52) U.S. Cl.
CPC .......... B23K 10/006 (2013.01); B23K 9/0953 (2013.01); B23K 37/0229 (2013.01)

(58) Field of Classification Search
CPC .... B23K 9/0953; B23K 10/00; B23K 10/006; B23K 37/0229
See application file for complete search history.

(56) References Cited

U.S. PATENT DOCUMENTS

| | | | |
|---|---|---|---|
| 6,268,583 B1 | 7/2001 | Yamaguchi et al. | |
| 6,772,040 B1 * | 8/2004 | Picard ................. | B23K 10/006 |
| | | | 700/165 |

| | | |
|---|---|---|
| 6,914,209 B2 | 7/2005 | Yamaguchi et al. |
| 7,071,441 B1 | 7/2006 | Bulle |
| 8,212,173 B2 | 7/2012 | Liebold et al. |
| 8,354,609 B2 | 1/2013 | Lindsay et al. |
| 8,389,887 B2 | 3/2013 | Liebold et al. |
| 8,710,395 B2 | 4/2014 | Lindsay et al. |
| 8,946,583 B2 | 2/2015 | Riemann et al. |
| 8,946,584 B2 | 2/2015 | Riemann et al. |
| 10,189,110 B2 | 1/2019 | Yamaguchi et al. |
| 10,486,261 B2 | 11/2019 | Harkare et al. |

(Continued)

FOREIGN PATENT DOCUMENTS

| | | |
|---|---|---|
| EP | 2556912 B1 | 12/2015 |
| EP | 2939782 B1 | 2/2017 |

(Continued)

OTHER PUBLICATIONS

Notification of Transmittal of International Search Report and Written Opinion for International Patent Application No. PCT/US2023/061578 dated Jun. 29, 2023, 11 pages.

*Primary Examiner* — Brian W Jennison

(74) *Attorney, Agent, or Firm* — Edell, Shapiro & Finnan, LLC

(57) ABSTRACT

A method, apparatus, and computer program product are provided for plasma piercing a workpiece using a plasma cutting torch. According to one implementation the method includes providing the plasma cutting torch at a first pierce height above a workpiece to initiate a piercing operation at the first pierce height for a first duration, during the piercing operation, lowering the plasma cutting torch to a second pierce height above the workpiece for a second duration, and lowering the plasma cutting torch to a cut height.

20 Claims, 13 Drawing Sheets

(56)                    References Cited

U.S. PATENT DOCUMENTS

| | | |
|---|---|---|
| 2014/0353294 A1 | 12/2014 | Yoshihiro et al. |
| 2020/0047278 A1 | 2/2020 | Harkare et al. |
| 2021/0053141 A1 | 2/2021 | Takata et al. |
| 2021/0205913 A1 | 7/2021 | Nadler et al. |

FOREIGN PATENT DOCUMENTS

| | | | |
|---|---|---|---|
| JP | 11291048 | A | 10/1999 |
| JP | 3291705 | B2 | 6/2002 |
| JP | 3804744 | B2 | 8/2006 |
| WO | 2006126339 | A1 | 11/2006 |

* cited by examiner

METHODS FOR OPERATING A PLASMA TORCH

TECHNICAL FIELD

The present disclosure relates to methods for operating a plasma torch when piercing a workpiece.

BACKGROUND

Often, fabricators may start a cut by positioning a plasma torch in the center of a workpiece rather than the edge. This requires a piercing operation, which becomes increasingly difficult as material thickness increases. Conventional approaches to piercing cause heat and slag to be reflected back to the plasma torch, which can damage the torch's front end and its consumables. To avoid or minimize this damage, piercing is often completed at an elevated position (relative to the workpiece), and the torch is dropped to a height suitable for cutting the metal after piercing. However, the elevated pierce height may be too high to allow the arc to reach through thick workpieces, as the thickness of the material may overextend the arc as the pierce moves through the thickness of the workpiece. Moving the torch laterally along a workpiece during piercing can help protect the torch but may hinder or prevent complete penetration of a thick workpiece. On the other hand, dropping to or towards the cut height before complete penetration can cause blowback of molten materials onto the torch's front end and consumables.

SUMMARY

Techniques for piercing and cutting a metal workpiece are disclosed. These techniques may be embodied as one or more methods, an apparatus, a system, and/or non-transitory computer readable storage media.

In accordance with at least one embodiment, the present application is directed to a method, apparatus, and computer program product for plasma piercing a workpiece using a plasma cutting torch. According to one implementation the method includes providing the plasma cutting torch at a first pierce height above a workpiece to initiate a piercing operation at the first pierce height for a first duration, during the piercing operation, lowering the plasma cutting torch to a second pierce height above the workpiece for a second duration, and lowering the plasma cutting torch to a cut height.

By descending from a first pierce height to a second pierce height during the piercing operation, present embodiments enable complete penetration of workpieces, including thicker workpieces, during a piercing operation while also avoiding or reducing damage to consumables. Accordingly, present embodiments greatly increase the lifespan of consumables in a plasma torch and/or allow for the piercing of thicker workpieces.

In some embodiments, the plasma cutting torch remains ignited during transition from the first pierce height to the second pierce height. Among other advantages, transitioning the plasma cutting torch during a piercing operation, while the torch remains ignited, reduces the amount of time required to perform the piercing operation. In particular, multiple re-ignition processes can be avoided, which can be time-consuming and can wear down consumables or needlessly consume other resources.

Still further, in some embodiments, prior to lowering the plasma cutting torch to the cut height, the plasma cutting torch is lowered to one or more additional pierce heights for one or more additional durations. Accordingly, rather than employing two piercing heights, three or more pierce heights can be achieved. Multiple pierce heights can be employed to provide a finer granularity of control over the piercing operation, which can extend the lifespan of consumables, reduce the amount of time required to pierce, and/or provide other benefits.

In some embodiments, one or more arc process parameters are adjusted at the first pierce height, at the second pierce height, or at the first pierce height and the second pierce height. The one or more arc process parameters can include a shield fluid parameter and/or a plasma gas parameter. Similarly, in some embodiments, one or more arc process parameters are adjusted during transition between the first pierce height and the second pierce height. Again, the one or more arc process parameters can include a shield fluid parameter and/or a plasma gas parameter. By varying arc process parameters in combination with, or proximate to, adjusting the pierce height, present embodiments may similarly extend the lifespan of consumables, reduce the amount of time required to pierce, and/or provide other features. For example, reducing the pressure of a plasma gas as the torch is lowered may prevent excess damage to consumables.

In some embodiments, one or more arc process parameters are adjusted at or proximate to a transition from the second pierce height to the cut height, the one or more arc process parameters including a shield fluid parameter and/or a plasma gas parameter. In a further embodiment, an adjustment of the shield fluid parameter at or proximate to the transition from the second pierce height to the cut height comprises transitioning a composition of a shield fluid from liquid to gas. Among other advantages, using a water mist, water or a mixture of water and gas as a shield may greatly extend the lifespan of consumables during the piercing phase while using other shield fluids, such as gas, during a cutting phase (e.g., after a workpiece is pierced) may better protect the consumables during cutting, to increase the speed or efficiency of cutting, reduce costs, and the like. That is, the cutting operation that is performed subsequent to the piercing operation may benefit from different shield fluid parameters and/or plasma gas parameters than those used during the piercing operation.

In some embodiments, the plasma cutting torch is moved horizontally with respect to the workpiece during one or more of: the piercing at the first height, and the piercing at the second height. Among other advantages, moving the plasma cutting torch horizontally during piercing provides the benefit of reducing damage to consumables. Thus, horizontal movement in combination with present embodiments (e.g., changing pierce height during piercing) can provide a greater degree of protection to consumables of a plasma cutting torch.

These and other advantages and features will become evident in view of the drawings and detailed description.

DETAILED DESCRIPTION

Figure 1A:
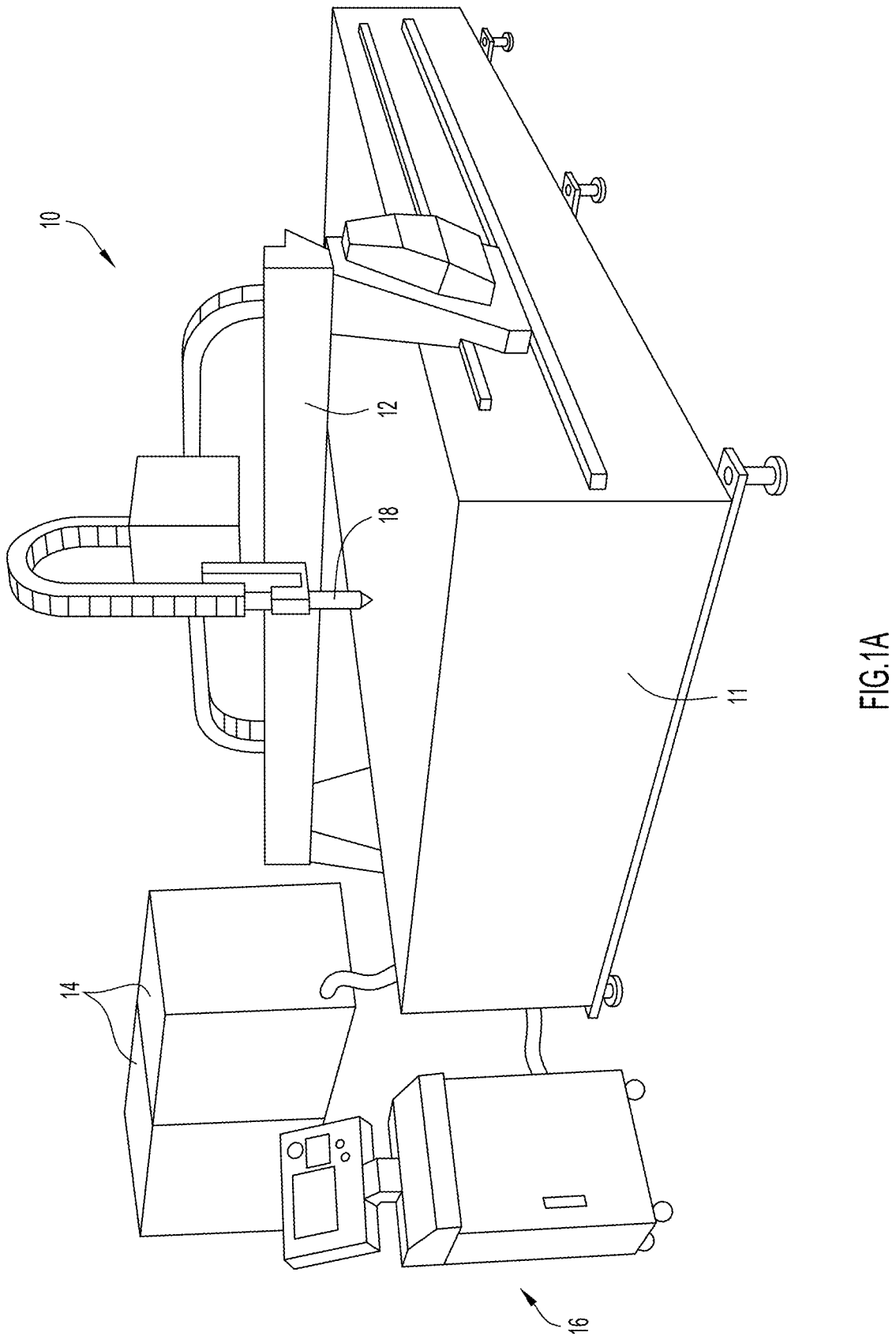
FIG. 1A is a perspective view of an automated cutting system that may execute the techniques presented herein, according to an example embodiment of the present disclosure.

The following description is not to be taken in a limiting sense but is given solely for the purpose of describing the broad principles of the present application. Embodiments of the present application will be described by way of example, with reference to the above-mentioned drawings showing elements and results of such embodiments.

Generally, with the techniques presented herein, the pierce height is modified during a piercing process. Initially, a first pierce height of a plasma torch may be selected that is suitable for maintaining a current transfer of the plasma to the workpiece without damaging the parts. Then, the torch is held at the first pierce height for a predetermined amount of time, a stage referred to as a first pierce stage or first "lead-in." At the end of the first pierce stage, the torch is changed to a new elevation to begin a second pierce stage for another predetermined amount of time. At the end of the second pierce stage, the pierce may be completed (e.g., when the plasma cuts entirely through the thickness of a workpiece) and the elevation may change to the final cut height. Alternatively, in some embodiments, parameters can be selected for subsequent pierce stages (i.e., the piercing can have more than two steps). Still further, in other embodiments, the step-wise piercing need not be stepped with definable steps and can be smoothed (e.g., to provide a movement pattern that is curved instead of rectangularly stepped). Additionally, in some embodiments, the torch may be moved horizontally with respect to the workpiece during and/or between any of the pierce stages. In any case, when the torch transitions from a piercing phase to a cutting phase, the torch parameters, such as the composition of the shield fluid, may be changed to optimize efficiency of cutting and fluid usage during the piercing phase and the cutting phase.

Conventional piercing techniques may start piercing at an elevated position, and then drop to a height that is suitable for cutting the workpiece after the piercing operation is completed. However, conventional piercing elevations may be too high to allow the arc to reach the workpiece. Some conventional techniques move the plasma torch horizontally relative to the workpiece, which may help protect the consumable elements of the torch, but horizontal movement at a fixed height may hinder complete penetration. Still further, dropping to a cut height prior to completion of the pierce can result in damage to the torch, especially when piercing/cutting thick materials with high current power, as heat and slag can be reflected back at the torch. Accordingly, present embodiments transition from a pierce height to a cut height, either in a series of steps, or gradually. Modifying the pierce height during the piercing process therefore provides the advantages of enabling a torch to completely penetrate (i.e., a complete pierce) workpieces, including thicker workpieces, while also avoiding or reducing damage to consumables. Accordingly, present embodiments greatly increase the lifespan of consumables in a plasma torch and/or allow for the piercing of thicker workpieces.

FIG. 1A illustrates an example embodiment of an automated cutting system 10 that may execute the techniques presented herein. However, this automated cutting system 10 is merely presented by way of example and the techniques presented herein may also be executed by manual cutting systems and/or automated cutting systems that differ from the automated cutting system 10 of FIG. 1A (e.g., any robotic or partially robotic cutting system). That is, the cutting system 10 illustrated in FIG. 1A is provided for illustrative purposes.

At a high-level, the cutting system 10 includes a table 11 configured to receive a workpiece (not shown), such as, but not limited to, sheets of metal. The automated cutting system also includes a positioning system 12 that is mounted to the table 11 and configured to translate or move along the table 11. At least one automated plasma arc torch 18 is mounted to the positioning system 12 and, in some embodiments, multiple automated plasma arc torches 18 may be mounted to the positioning system 12. The positioning system 12 may be configured to move, translate, and/or rotate the torch 18 in any direction (e.g., to provide movement in all degrees of freedom).

Additionally, at least one power supply 14 is operatively connected to the automated plasma arc torch 18 and configured to supply (or at least control the supply of) electrical power and flows of one or more fluids to the automated plasma arc torch 18 for operation. Finally, a controller or control panel 16 is operatively coupled to and in communication with the automated plasma arc torch 18, the one or more power supplies 14, and the positioning system 12. The controller 16 may be configured to control the operations of the automated plasma arc torch 18, one or more power supplies 14, and/or the positioning system 12, either alone or in combination with the one or more power supplies 14.

In at least some embodiments, the one or more power supplies 14 meter one or more flows of fluid received from one or more fluid supplies before or as the one or more power supplies 14 supply gas to the torch 18 via one or more cable conduits. Additionally or alternatively, the automated cutting system 10 may include a separate fluid supply unit (not shown) or units that can provide one or more fluids to the automated torch 18 independent of the one or more power supplies 14. To be clear, as used herein, the term "fluid" shall be construed to include a gas or a liquid. The one or more power supplies 14 may also condition, meter, and supply power to the automated torch 18 via one or more cables, which may be bundled with, integrated with, or provided separately from cable conduits for fluid flows. Additional cables for data, signals, and the like may also interconnect the controller 16, the automated plasma arc torch 18, the power supply 14, and/or the positioning system 12. Any cable or cable conduit/hose included in the automated cutting system 10 may be any length. Moreover, each end of any cable or cable conduit/hose may be connected to components of the automated cutting system 10 via any connectors now known or developed hereafter (e.g., via releasable connectors).

Figure 1B:
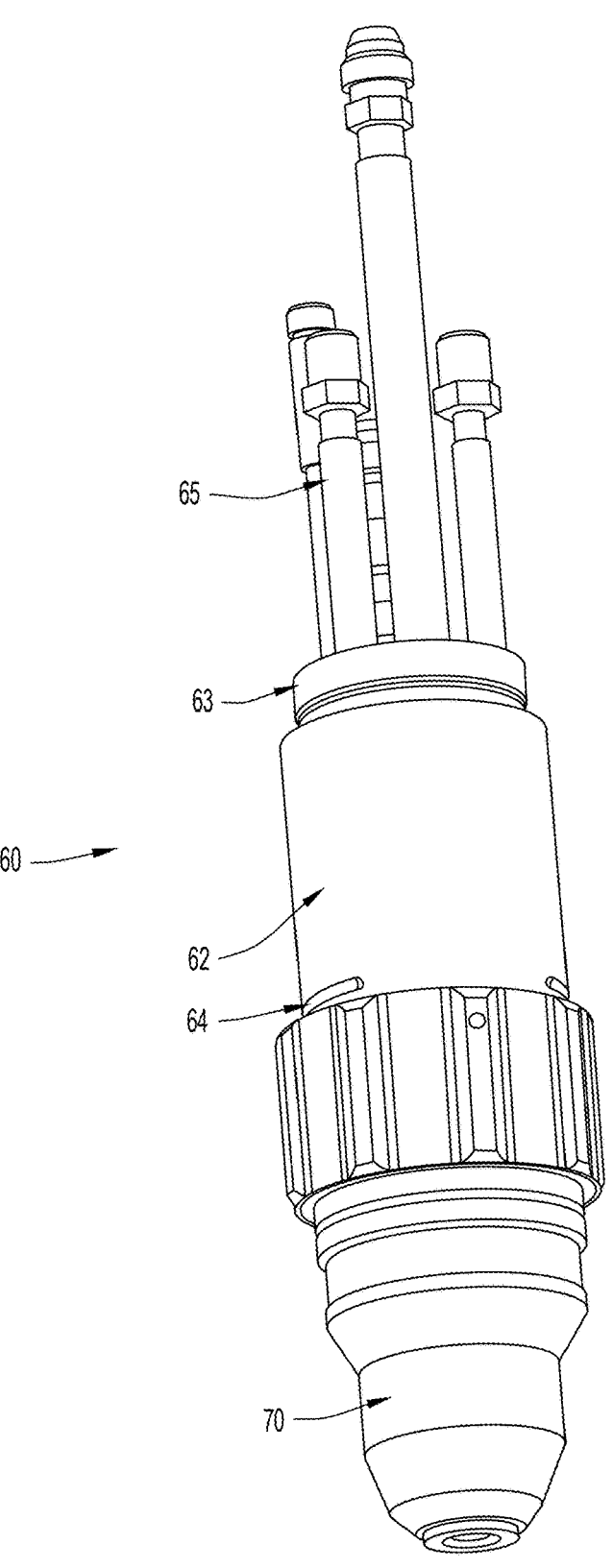
FIG. 1B is perspective view of an automated cutting head that may be included in the automated cutting system illustrated in FIG. 1A, according to an example embodiment of the present disclosure.

FIG. 1B illustrates an example embodiment of an automated cutting head 60 that may be used with an automated cutting system executing the techniques presented herein (e.g., the cutting system 10 of FIG. 1A). As can be seen, the cutting head 60 includes a body 62 that extends from a first end 63 (e.g., a connection end 63) to a second end 64 (e.g., an operating or operative end 64). The connection end 63 of the body 62 may be coupled (in any manner now known or developed hereafter) to an automation support structure (e.g., a cutting table, robot, gantry, etc., such as positioning system 12). Meanwhile, conduits 65 extending from the connection end 63 of the body 62 may be coupled to like conduits in the automation support structure (e.g., positioning system 12) to connect the automated cutting head 60 to a power supply, one or more fluid supplies, a coolant supply, and/or any other components supporting automated cutting operations.

At the other end, the operative end 64 of the body 62 may receive interchangeable components, including consumable components 70 that facilitate cutting operations. For simplicity, FIGS. 1A and 1B do not illustrate connections portions of the body 62 that allow consumable components 70 to connect to the torch body 62 in detail. However, it should be understood that the cutting consumables, such as those schematically illustrated in FIG. 1C, may be coupled to a torch body 62 in any manner. Moreover, to be clear, the consumable stack 70 depicted in FIGS. 1B and 1C (with an external perspective view and a schematic cross-sectional illustration, respectively) is merely representative of a consumable stack that may be used with an automated torch executing the techniques presented herein. Similarly, while none of the Figures of the present application illustrate an interior of torch body 62, it is to be understood that any unillustrated components that are typically included in a torch, such as components that facilitate cutting operations, may (and, in fact, should) be included in a torch executing example embodiments of the present application.

Figure 1C:
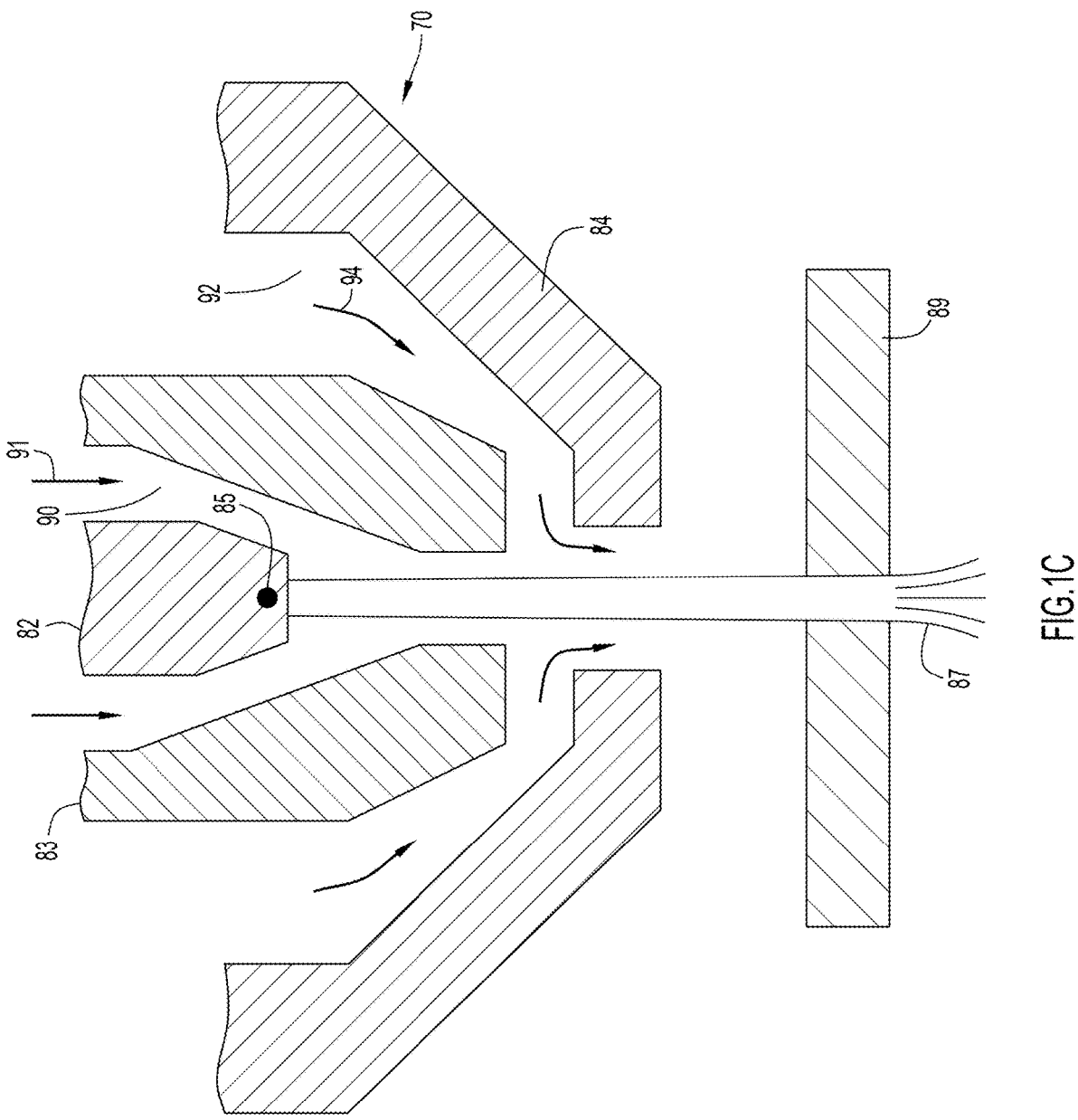
FIG. 1C is a schematic, cross-sectional view of an end portion of a plasma torch.

Now turning to FIG. 1C, this Figure is a simplified/ schematic illustration of the consumable stack 70 of FIG. 1B. As mentioned, FIG. 1C only illustrates select components or parts that allow for a clear and concise illustration of the techniques presented herein. Thus, in FIG. 1C, only an electrode 82, a nozzle 83, and a shield cap 84 of the consumable stack 70 are depicted. As can be seen, the electrode 82 is disposed at a center of the consumable stack 70 and includes an emitter 85 (e.g., formed from hafnium, tungsten, and/or other emissive materials) at a distal end portion thereof. The torch nozzle 83 is generally positioned around the electrode 82. In some embodiments the nozzle 83 is installed after the electrode 82. Alternatively, the electrode 82 and nozzle 83 can be installed onto the torch body as a single component (e.g., these components may be coupled to each other to form a cartridge and installed on/in the torch body as a cartridge). In either case, the nozzle 83 may be spaced from the electrode 82, or at least a distal portion of the nozzle 83 may be spaced apart from the distal portion of the electrode 82.

The shield 84 is positioned radially exteriorly of the nozzle 83 and is spaced apart from the nozzle, at least at its distal end. In some embodiments, the shield 84 is installed around an installation flange of the nozzle 83 in order to secure nozzle 83 and electrode 82 in place at (and in axial alignment with) an operating end of the torch body. Additionally or alternatively, the nozzle 83 and/or electrode 82 can be secured or affixed to a torch body in any desirable manner, such as by mating threaded sections included on the torch body with corresponding threads included on the components. For example, in some implementations, the electrode 82, nozzle 83, shield 84, as well as any other components (e.g., a lock ring, spacer, secondary cap, etc.)

may be assembled together in a cartridge that may be selectively coupled to the torch body, e.g., by coupling the various components to a cartridge body and/or by coupling the various components to each other to form a cartridge.

In use, a plasma torch is configured to emit a plasma arc 87 between the electrode 82 and a workpiece 89 to which a work lead associated with a power supply is attached (not shown). As shown in FIG. 1C, the nozzle 83 is spaced a distance away from the electrode 82 so that a plasma gas flow channel 90 is disposed therebetween. During piercing and cutting operations, a plasma gas 91 flows through the plasma gas flow channel 90. The shield 84 is also spaced a distance away from the nozzle 83 so that a shield flow channel 92 is disposed between the shield 84 and the nozzle 83, A shield fluid 94 flows through the shield flow channel 92 during at least a portion of the time the torch is operated.

While FIG. 1C provides one schematic view of torch consumables that can execute the techniques presented herein, for completeness, it should be understood that U.S. Pat. No. 9,131,596 discloses a plasma torch that is also usable in carrying out the processes disclosed herein, and is incorporated herein by reference in its entirety.

Figure 2:
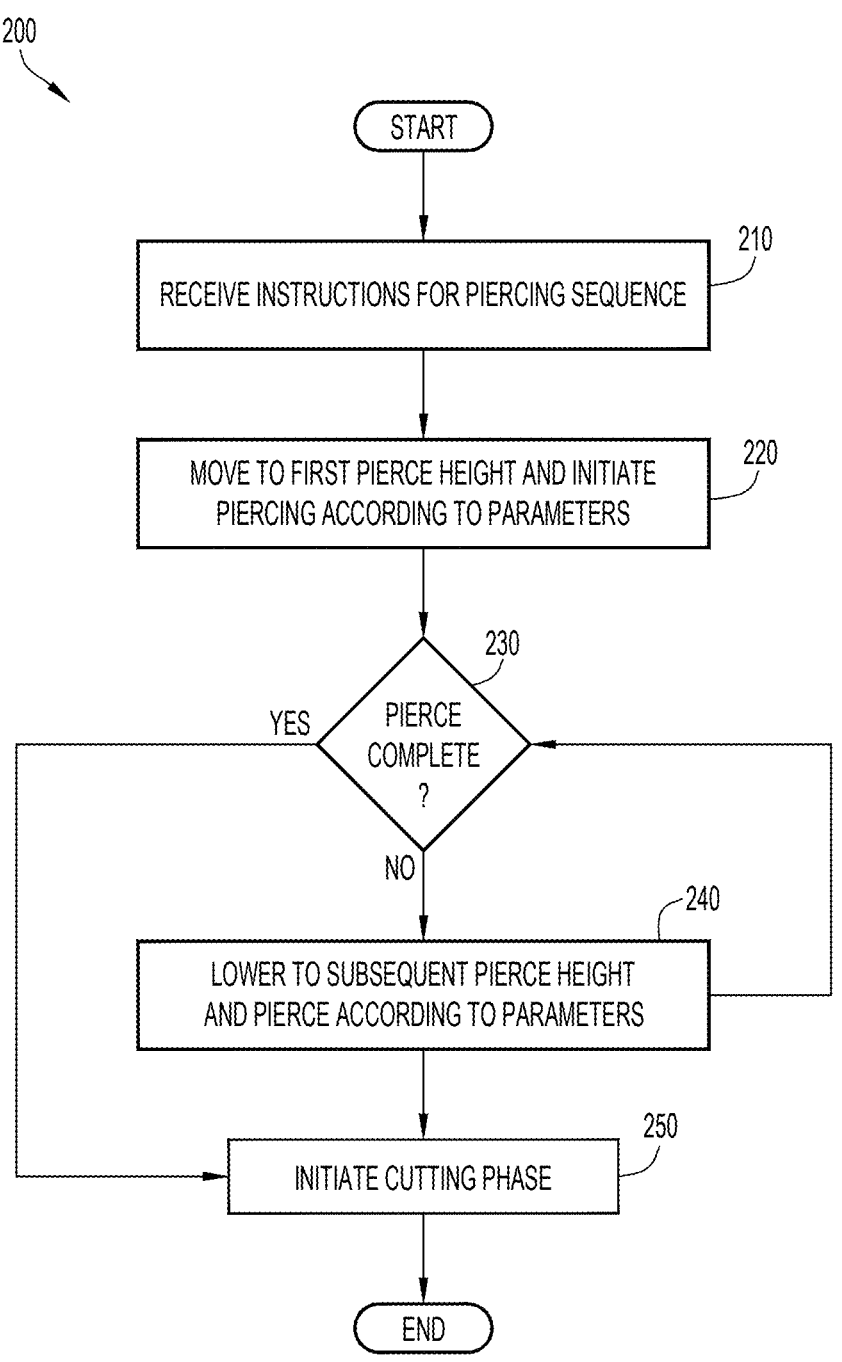
FIG. 2 is a flow chart depicting a method of piercing a workpiece, according to an example embodiment.

FIG. 2 is a flow chart depicting a method 200 of piercing a workpiece, according to an example embodiment. Initially, instructions for a piercing sequence are received at operation 210. Instructions may be provided into a computing device (e.g., computing device 600, depicted and described in further detail with respect to FIG. 6) that controls operation of a plasma cutting system (e.g., cutting system 10). The instructions may be entered by a user, retrieved from a local or network-accessible storage device, and the like, and may include any instructions that are executable to cause a plasma cutting system to perform a job, including pierce and cut operations. In particular, the instructions may indicate pierce and/or cut locations, pierce and/or cut times, arc process parameters (e.g., fluid types and/or pressures for the shield fluid and/or plasma), plasma torch heights, any instructions to move a plasma torch relative to a workpiece during cutting and/or piercing operations, and the like.

At operation 220, a plasma arc torch (e.g., plasma arc torch 18) is moved to a first pierce height and piercing is initiated according to provided parameters. In some embodiments, the plasma arc torch moves to contact the workpiece prior to moving away to the first pierce height in order to ensure that the pierce operation begins at the desired height. Once the plasma arc torch is positioned at the first pierce height, piercing may begin according to the parameters provided in the instructions received at operation 210. In particular, piercing may be performed for a particular predefined or other duration of time using the predefined parameters. In some embodiments, horizontal movement of the plasma arc torch is initiated at or proximate to initiation of piercing.

Operation 230 determines whether the piercing operation is ready to be completed. In accordance with present embodiments, piercing is performed in multiple stages, including at least two stages; therefore, the first pierce stage will be followed by one or more subsequent pierce stages. Accordingly, initially method 200 proceeds to operation 240, wherein the plasma arc torch is lowered to a subsequent pierce height and the overall piercing operation proceeds according to provided parameters. The parameters for the one or more additional pierce heights (which occur at pierce stages or "lead-ins") may be the same or may be different; in some embodiments, for example, the parameters, such as current, plasma gas pressure, shield fluid pressure, etc., may be varied with regard to a given pierce height. The overall piercing operation will complete when all pierce stages are finished (e.g., when the final pierce stage fully pierces the workpiece).

After lowering the plasma torch to the subsequent pierce height, method 200 may return to operation 230 to determine whether the piercing process is completed. Depending on the provided instructions, operations 230 and 240 may be repeated multiple times, with the plasma arc torch's elevation being lowered to be closer to the workpiece each iteration. In some embodiments, the plasma arc torch is held at a particular pierce height for a duration of a step and is then lowered to the next instructed pierce height in step-wise movements. In some embodiments, the plasma arc torch may be continuously moved horizontally with respect to the workpiece during some or all of the piercing operation, at a smooth rate and/or at a varied rate, during which one or more of the arc process parameters, such as current, plasma gas pressure, shield fluid pressure, etc., may optionally be varied as desired.

When it is determined that the pierce is complete, method 200 proceeds to initiate a cutting operation at operation 250. In some embodiments, the plasma arc torch is lowered to a cut height, and/or one or more arc process parameters are modified. For example, the provided instructions may cause the plasma torch to switch from a liquid (e.g., water) or mist shielding fluid to a gas shielding fluid at or proximate to initiation of the cutting operation. However, the cutting operation need not maintain specific parameters over the entirety of a cut and can, for example, utilize dynamic height adjustments, dynamic pressure adjustments, and/or other dynamic parameter adjustments over the course of a cutting operation.

Figure 3:
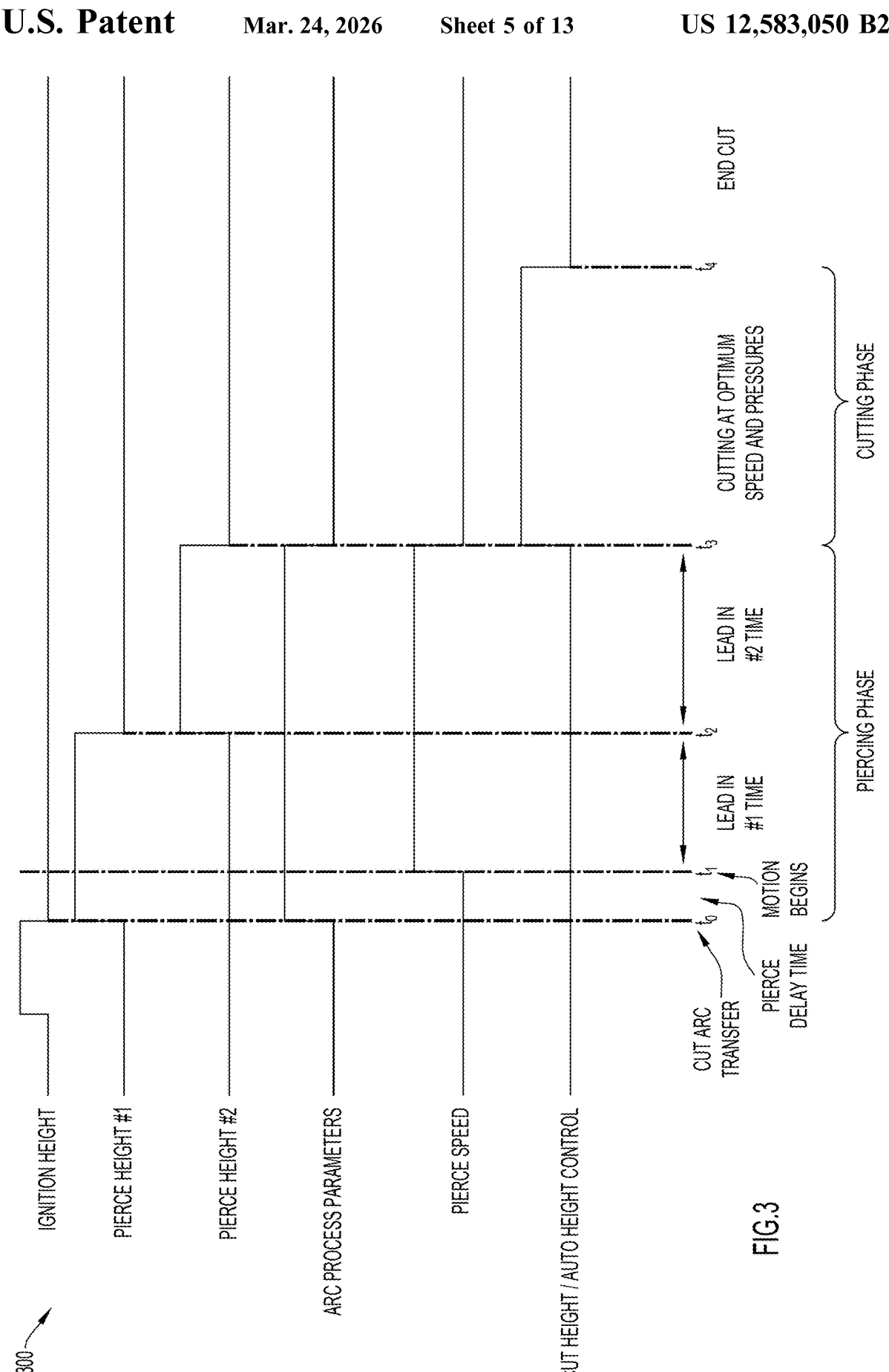
FIG. 3 is a graph showing variations in plasma torch operating parameters over time wherein pierce height is modified during a piercing operation.

FIG. 3 is a graph 300 showing variations in plasma torch operating parameters over time wherein pierce height is modified during a piercing operation. In the depicted embodiment, the jumps in heights for each timeline (e.g., ignition height timeline, pierce height #1 timeline, etc.) indicate some activity of a plasma arc torch (e.g., plasma arc torch 18) with respect to the other parameters. That is, a step away from a horizontal baseline over a span of time indicates that adjustments are being made for that particular parameter or parameters indicates that these parameter or parameters are active. For example, a rectangular step in the ignition height indicates a period of time when the torch is disposed at an ignition height. Accordingly, the timelines should not be construed as indicating magnitudes of the parameters indicated in each timeline.

At time $t_0$, the plasma arc torch has moved to the ignition height (e.g., after zeroing out), and pilot gas flowing through channel 30 is ionized to initiate an arc and form an electrically conductive plasma that is then directed out the nozzle toward an electrically conductive workpiece (e.g. metal workpiece). Upon arc transfer to the workpiece at time $t_1$, a piercing current is supplied to the electrode 23 and a first piercing operation begins. In the depicted embodiment, plasma, shield gas, and/or water injection begins at time to according to the pierce arc process parameters, which are continued throughout the piercing process (e.g., from time $t_1$ to time $t_3$, until switching to cutting parameters). All of these torch operations are generally indicated by the "Arc Process Parameters" line of FIG. 3. Generally, these parameters may include any variations, changes, ramping, or other such schemes, such as those discussed in U.S. application Ser. No. 16/731,455, entitled "Methods for Operating a Plasma Torch," the disclosure of which is incorporated herein by reference in its entirety.

In the depicted example of graph 300, the piercing operation comprises a two-step process with a first lead-in or pierce stage (from time $t_1$ to time $t_2$) and a second lead-in or pierce stage (from time $t_2$ to time $t_3$). As depicted, during the piercing pierce stages, the pierce height is modified to move the plasma arc torch closer to the workpiece. In various embodiments, the plasma arc torch may be moved in a step-wise pattern (e.g., held at a defined elevation for the first pierce stage, then moved closer to a second elevation at the second pierce stage), or the elevation may be smoothly or otherwise modified during part or substantially all of the piercing phase. Notably, by moving the torch downwards during a pierce, the arc length (i.e., the distance between the electrode and the material being removed by the arc) may be held relatively constant and/or decreased. This may enhance arc stability, which may focus the arc and maintain arc power to ensure that a pierce is completed, even with a thick workpiece. Thus, the techniques presented herein may be especially beneficial for thick workpieces (i.e., workpieces with a thickness greater than 0.750").

In the depicted embodiment, the torch also starts to move horizontally (e.g., in the X-Y plane and/or around a pipe) during the first step. Specifically, at time $t_1$, the torch begins to move at a certain speed. By starting this movement after the arc transfer at time $t_0$, the torch will begin to pierce (e.g., remove material) in a single location prior to horizontal movement. Then, from time $t_1$ to time $t_3$, the torch speed can be adjusted to move the torch horizontally while also adjusting the height of the torch (e.g., from pierce height 1 to pierce height 2). This horizontal movement may spread the pierce over a distance, which may reduce the amount of slag produced in a single location. Thus, this movement may reduce spatter and/or slag formation, each of which can damage a torch and/or negatively impact automation operations (e.g., by creating slag piles that must be navigated, by preventing touches for stand-off determinations, and/or by increasing the effective thickness of a workpiece to be cut).

During any of these movements, one or more arc process parameters may be changed, including the composition and/or pressure of shield and/or cutting gasses, or other parameters (e.g., voltage). For example, during the piercing phase, liquid shielding fluid may be used to shield the plasma arc. The liquid may provide greater arc restriction and enhance cooling of the consumables that are directing plasma to the workpiece to pierce a thick workpiece. When thicker workpieces are pierces, this enhanced cooling may be necessary to prevent destruction of the consumables at least because thicker workpieces are typically pierced with higher current power, such as approximately 600 Amps or more, including currents in the range of approximately 600 to approximately 800 Amps, approximately 900 Amps (e.g., 890 Amps), or more. However, after the pierce is complete and as the arc length and/or the current decreases, this enhanced cooling may no longer be required and the cooling provided shield fluid flow can be reduced, for example, by transitioning the shield fluid composition from a liquid to a gas. This may save resources and reduce the amount of liquid acting on a workpiece (which may be difficult to clean and contain).

After the piercing phase is completed (e.g., at time $t_3$), the plasma arc torch may be positioned at the cut height so that cutting may begin. The cutting phase may proceed in accordance with any techniques now known or developed hereafter (e.g., dynamic height and/or pressure control techniques), until completion at time $t_4$. As mentioned, in at least some embodiments, the shield fluid is gas during the cutting phase at least because the enhanced cooling and/or arc restriction provided by liquid may no longer be required.

FIGS. 4A-4E are graphs showing variations in plasma torch operating parameters over time wherein pierce height is modified during a piercing operation. In contrast to graph 300 of FIG. 3, these graphs may indicate changes in elevation of a plasma arc torch (e.g., plasma arc torch 18) during a cutting phase that includes two or more pierce stages with respect to time. That is, while FIG. 3 generally shows when certain parameters are "active," FIGS. 4A-4E depict torch heights. It should be appreciated that the variations in plasma torch operating parameters shown in FIGS. 4A-4E are examples of a few possible parameters, and present embodiments may employ any possible patterns of plasma torch height changes during piercing, including combinations of patterns that are either depicted herein and/or other patterns.

Figure 4A:
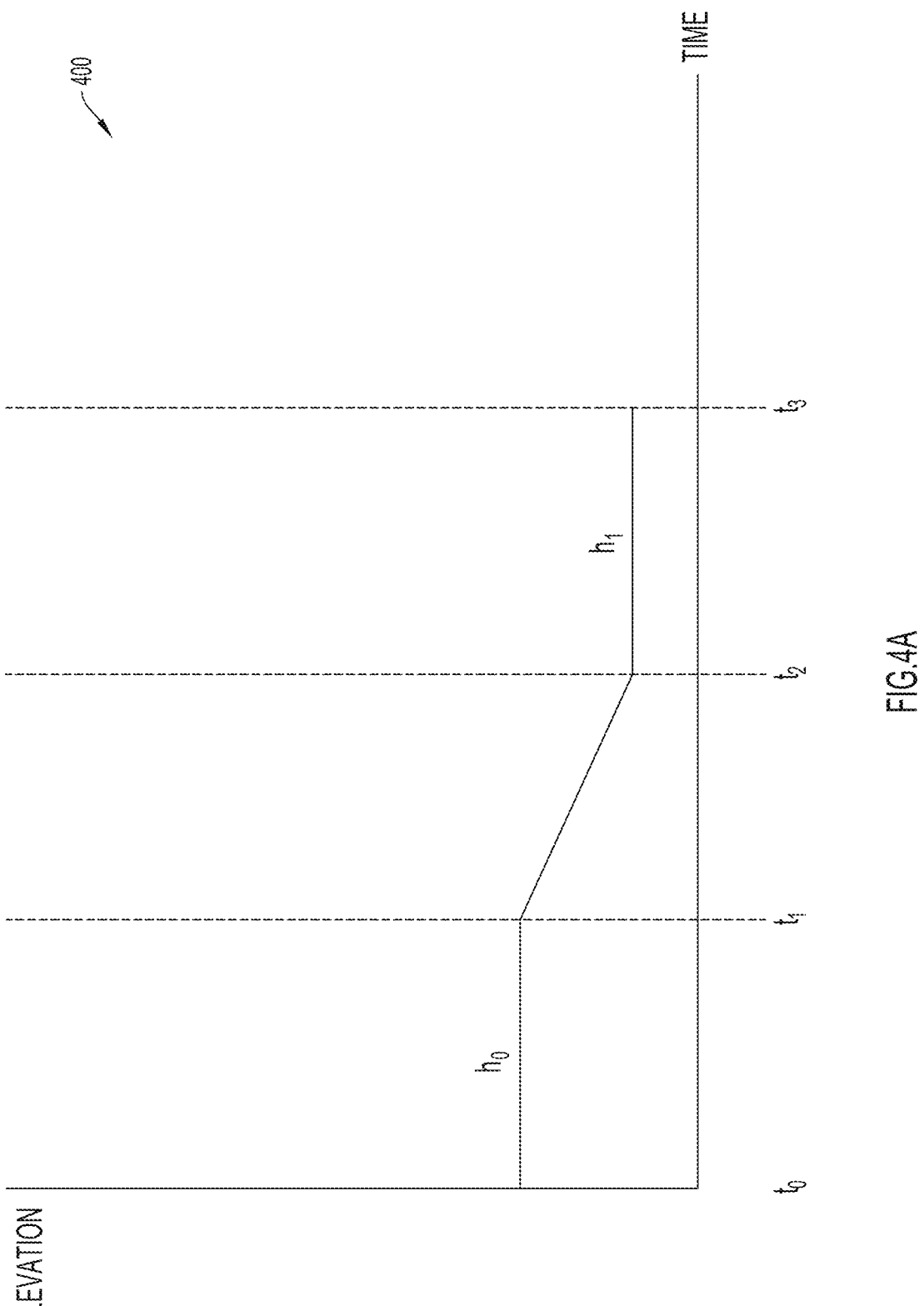
FIGS. 4A-4E are graphs showing variations in plasma torch operating parameters over time wherein pierce height is modified during a piercing operation.

Turning to FIG. 4A, a graph 400 is depicted showing a two-step pierce process. As depicted, piercing is first performed at an elevation $h_0$ from time to $t_0$ time $t_1$. The plasma arc torch is then lowered, from time $t_1$ to time $t_2$, to a second elevation, $h_1$. Accordingly, in the depicted embodiment of graph 400, the plasma arc torch performs piercing at an initial pierce height (e.g., $h_0$), is lowered linearly, at a substantially smooth rate while continuing piercing, and then pierces at a subsequent height (e.g., $h_1$) until the piercing operation is completed.

Figure 4B:
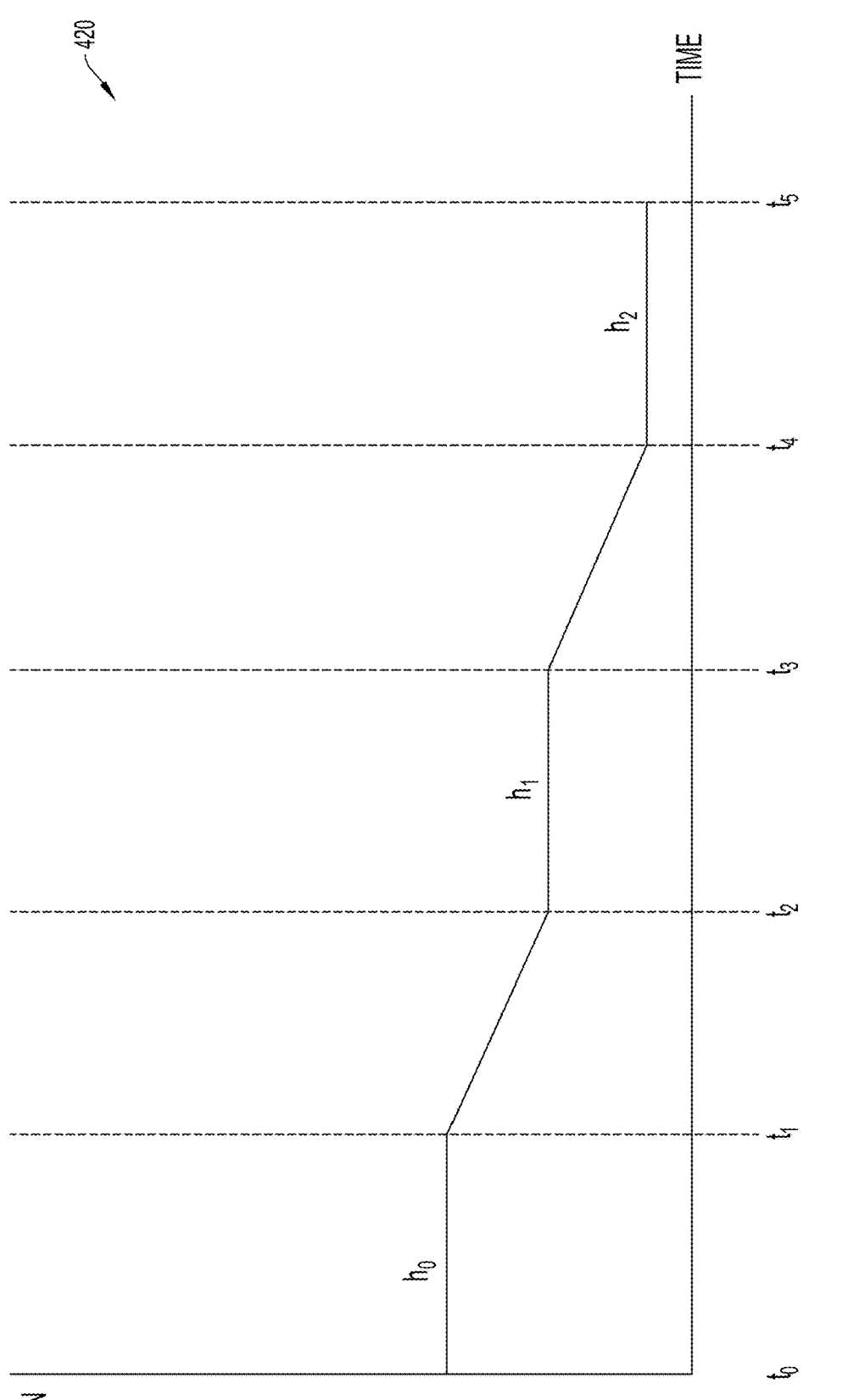

Turning now to FIG. 4B, a graph 420 is provided that depicts an embodiment in which three different elevations are used during a piercing operation. Accordingly, in contrast to the embodiment depicted in FIG. 4A, there are three separate piercing heights (e.g., $h_0$, $h_1$, and $h_2$). As depicted, a plasma arc torch initiates a piercing operation at elevation $h_0$ from time to $t_0$ time $t_1$, transitions to elevation $h_1$ from time $t_1$ to time $t_2$, continues piercing at elevation $h_1$ from time $t_2$ to time $t_3$, then descends again to a subsequent elevation $h_2$ at which piercing continues from time $t_4$ to time $t_5$, whereupon the piercing operation may be completed. Again, in the embodiment depicted in FIG. 4B, transitions in pierce heights are performed in a substantially smooth manner; however, it should be appreciated that the various embodiments presented herein can be combined in any manner to achieve any piercing pattern (e.g., multiple piercing steps with smooth and/or other transitions between steps, piercing without maintaining a constant elevation, etc.).

Figure 4C:
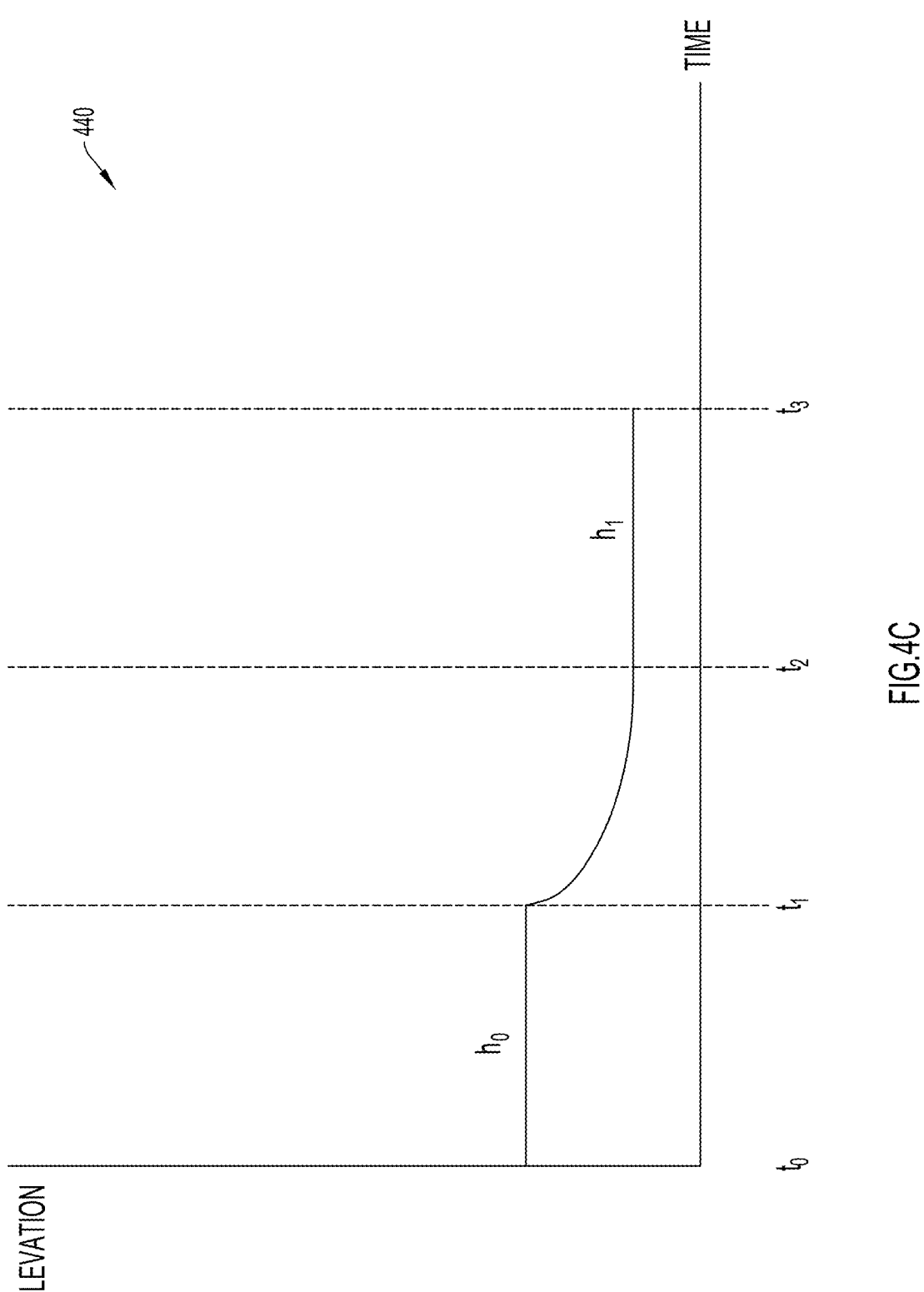

With reference now to FIG. 4C, a graph 440 depicts a two-step piercing operation in which the transition from a first height, $h_0$, to a second height, $h_1$, is neither smooth nor linear. Rather, the inflection of the height between times $t_1$ and $t_2$ indicates that the change in elevation begins quickly before tapering off and arriving at height $h_1$, whereupon the plasma arc torch is held constant at until completing the pierce operation at time $t_3$. However, this is merely one example embodiment of a non-linear transition and, in other embodiments, any desirable transition could be used (e.g., rounded at one or more rates, stepped with one or more steps of any shape, etc.).

Figure 4D:
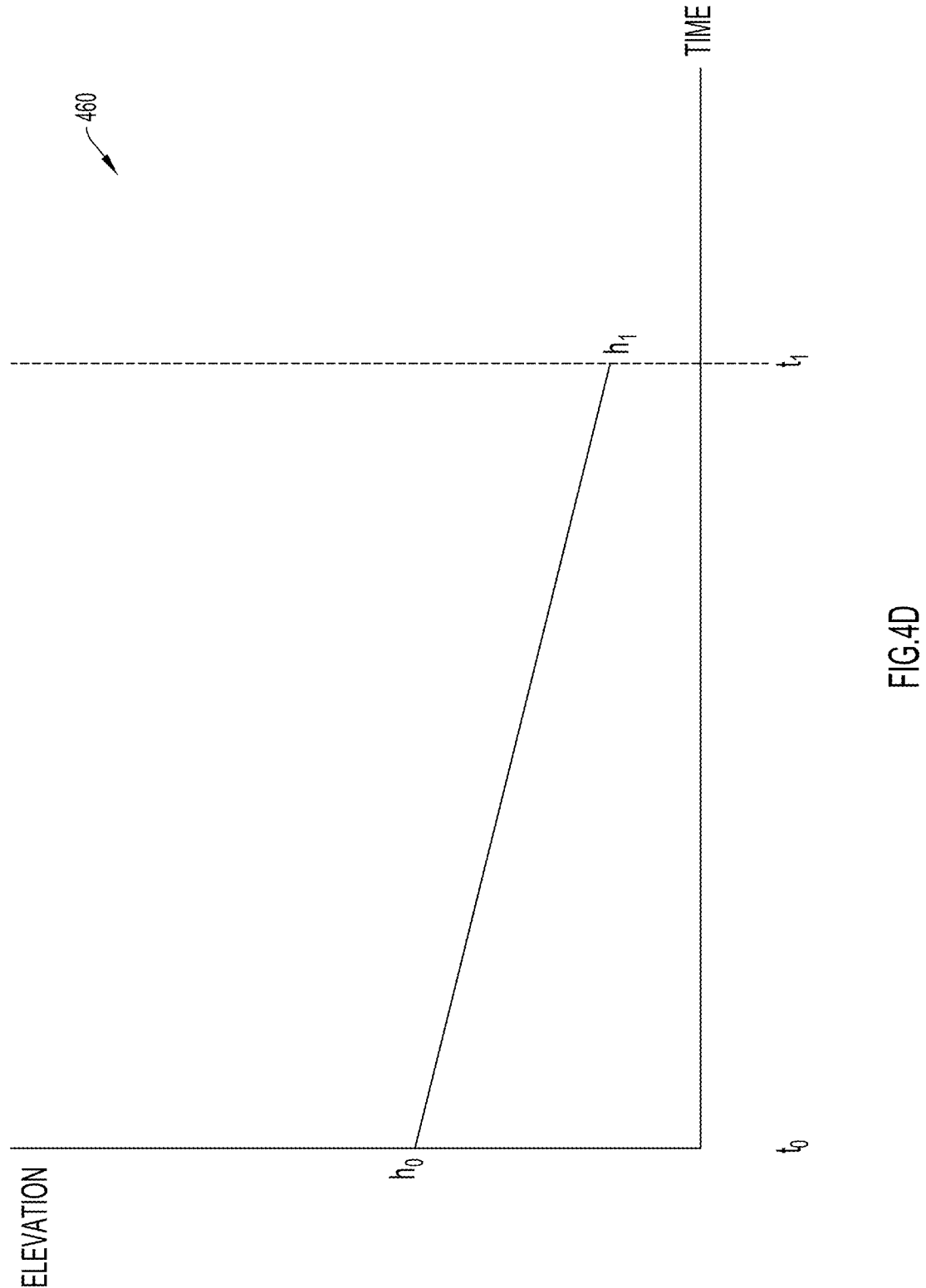

FIG. 4D depicts a graph 460 in which a plasma arc torch performs a pierce operation during which a smooth change in elevation is performed throughout the pierce. As indicated, piercing begins at time $t_0$ and height $h_0$, and as piercing continues, the plasma arc torch is continuously lowered to a second height, $h_1$, at time $t_1$, at which point, or proximate to time $t_1$, the pierce operation is completed.

Figure 4E:
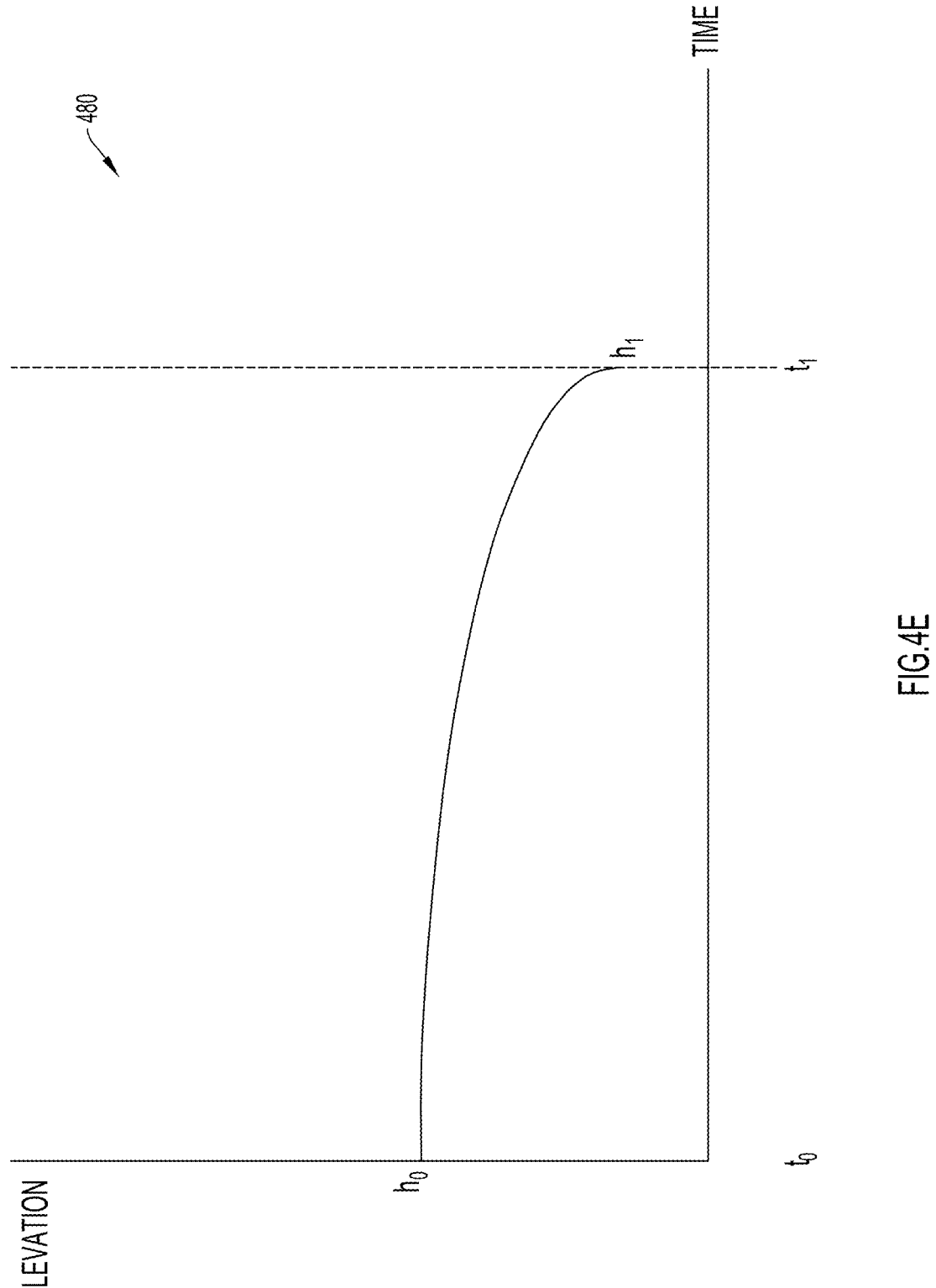

Similarly to FIG. 4D, FIG. 4E depicts a graph 480 at which a plasma arc torch performs a pierce operation with a varied rate of change of elevation during the pierce operation. As depicted, piercing begins at time $t_0$ and height $h_0$, and as piercing continues, the plasma arc torch is lowered at an increasing rate to a second height, $h_1$, at time $t_1$, at which point, or proximate to time $t_1$, the pierce operation is likewise completed. Again, this is merely one example embodiment of a non-linear rate of change and, in other embodiments, any desirable rate of change or combination of rates of change could be used.

Figure 5A:
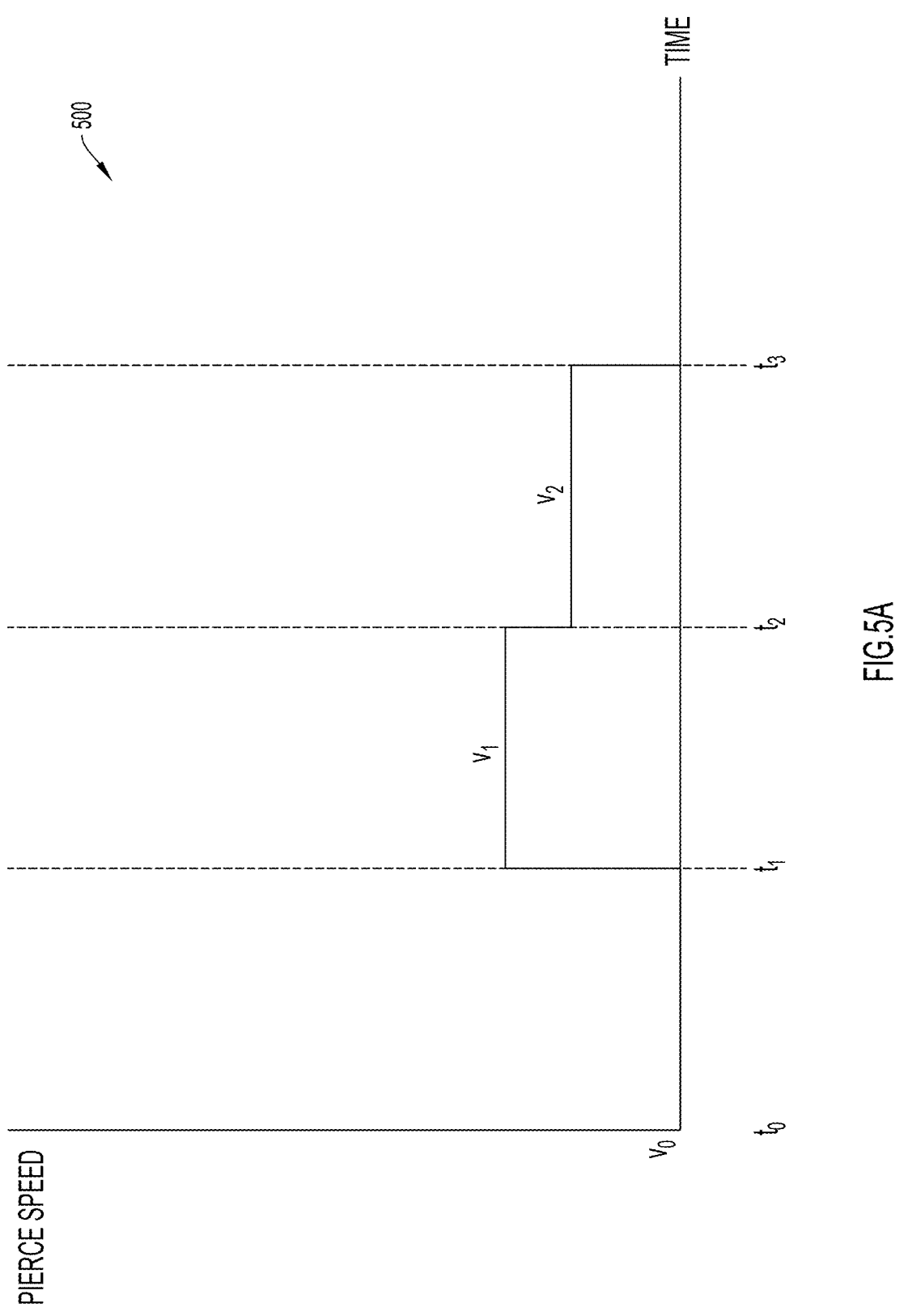
FIGS. 5A and 5B are graphs showing variations in plasma torch operating parameters over time wherein a plasma arc torch is moved horizontally in relation to a workpiece during the piercing operation presented herein.
Figure 5B:
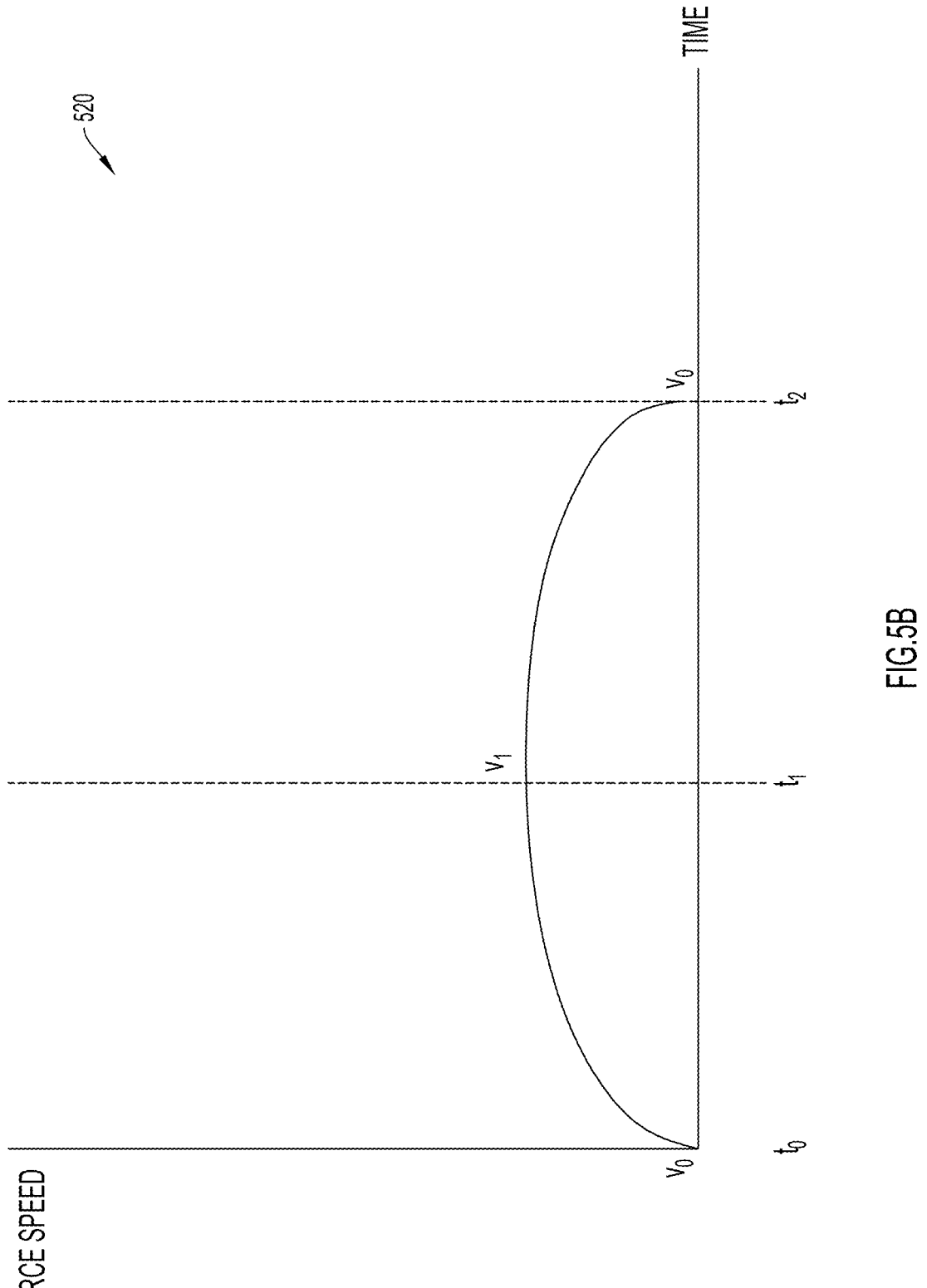

FIGS. 5A and 5B are graphs showing variations in plasma torch operating parameters over time wherein a plasma arc torch is moved horizontally in relation to a workpiece during a piercing operation (i.e., variations in "pierce speed" as is shown in FIG. 3). It should be appreciated that the variations in plasma torch operating parameters shown in FIGS. 5A and 5B are examples of a few possible parameters, and present embodiments may employ any possible patterns of translating a plasma torch horizontally with respect to a workpiece during piercing, including combinations of patterns that are either depicted herein and/or other patterns. It should also be appreciated that any horizontal movement pattern, depicted herein or otherwise, can be combined with vertical movements of a torch (e.g., the movements depicted in FIGS. 4A-4E) to achieve any desirable result. That is, the torch may move at desirable horizontal speed or speeds during any portion of the piercing operations presented herein (i.e., during one or more piercing phases or lead-ins).

Turning to FIG. 5A, a graph 500 is depicted showing a horizontal movement speed of a plasma arc torch relative to a workpiece. As depicted, when piercing is initiated, there may initially be no horizontal movement (e.g., from time $t_0$ to $t_1$); during this period, torch ignition may occur, and/or the torch may be vertically moved to a first pierce elevation. At time $t_1$, horizontal movement speed ramps up from the substantially resting state (e.g., $v_0$) to a constant speed $v_1$ that is held from time $t_1$ to time $t_2$. During a subsequent pierce stage, horizontal movement speed of the plasma arc torch is then lowered to $v_2$, which is held substantially constant from time $t_2$ to time $t_3$. Accordingly, in the depicted embodiment of graph 500, the plasma arc torch changes from a substantially resting state to a first speed, and then changes to a second speed. After the workpiece is fully pierced (e.g., at or proximate to time $t_3$), it should be appreciated that horizontal movement of the torch with respect to the workpiece will occur during a subsequent cutting phase.

Now with respect to FIG. 5B, a graph 520 is depicted showing another horizontal movement speed of a plasma arc torch relative to a workpiece. As depicted, horizontal movement is initiated at time $t_0$, and the horizontal movement speed increases from a substantially resting state (e.g., $v_0$) until reaching a maximum speed of $v_1$ at time $t_1$. The horizontal movement speed of the plasma arc torch then begins to decrease during a second piercing stage (e.g., spanning time $t_1$ to time $t_2$) at which point the horizontal movement speed is reduced until the second piercing stage is completed (at which point the workpiece may be fully pierced). Accordingly, in the depicted embodiment of graph 520, the plasma arc torch accelerates until reaching a desired horizontal movement speed, whereupon the plasma arc torch decelerates the horizontal movement with respect to the workpiece. However, it should be appreciated that in various embodiments, any combinations of patterns for various movement speeds and acceleration can be utilized, such as various linear or other ramping of horizontal movement, stepped ramping of horizontal movement, increasing or decreasing horizontal movement according exponentially or according to other functions such as a polynomial function, etc.

Figure 6:
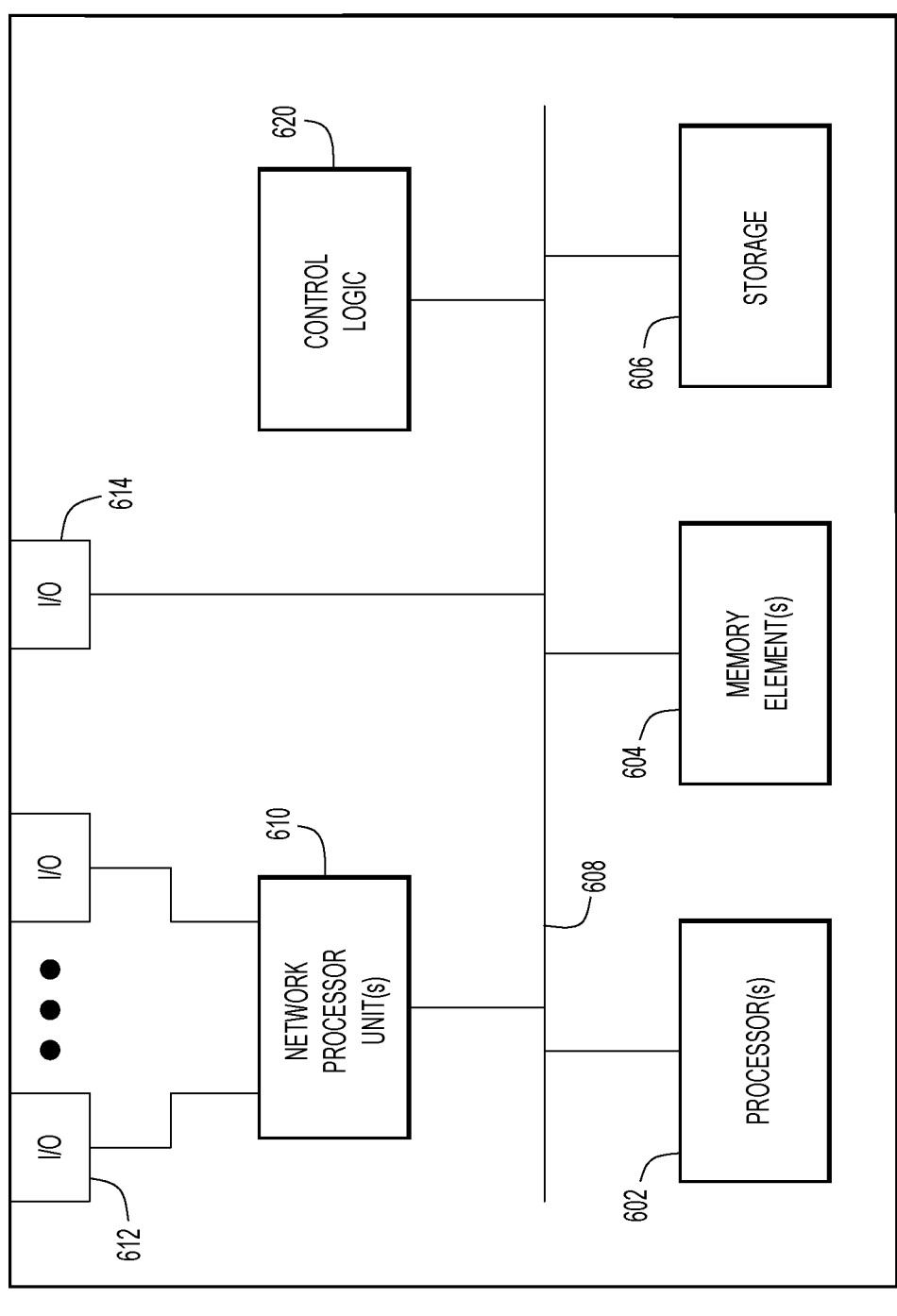
FIG. 6 is a block diagram depicting a computing device for controlling a plasma torch in accordance with an example embodiment.

Now turning to FIG. 6, this Figure illustrates a hardware block diagram of a computing device 600 that may execute the techniques presented herein. This computing device 600 may be included in or formed from portions of any combination of parts included in the controller 16, the automated plasma arc torch 18, the power supply 14, and/or the positioning system 12 of an automated cutting system 10. Thus, any of the controller 16, the automated plasma arc torch 18, the power supply 14, and/or the positioning system 12 of an automated cutting system 10 may execute the techniques presented herein, alone or in combination with one or more other systems/components.

As depicted, the computing device 600 includes a bus 608, which provides communications between computer processor(s) 602, one or more memory elements 604, persistent storage 606, one or more network processor units 610 (i.e., a communications unit), and input/output (I/O) interface(s) 614. Bus 608 can be implemented with any architecture designed for passing data and/or control information between processors (such as microprocessors, communications and network processors, etc.), system memory, peripheral devices, and any other hardware components within a system. For example, bus 608 can be implemented with one or more buses.

Memory 606 and/or memory element 604 may include random access memory (RAM) or other dynamic storage devices (i.e., dynamic RAM (DRAM), static RAM (SRAM), and synchronous DRAM (SD RAM)), for storing information and instructions to be executed by processor 602. The memory 606 and/or memory element 604 may also include a read only memory (ROM) or other static storage device (i.e., programmable ROM (PROM), erasable PROM (EPROM), and electrically erasable PROM (EEPROM)) for storing static information and instructions for the processor 602. Additionally, although "control logic" 620 is illustrated separately from memory 606 and/or memory element 604, the control logic 620 may be stored as non-transitory computer readable instructions in memory 606 and/or memory element 604, for execution by processor 602 so that processor 602 can execute the techniques presented herein.

Although FIG. 6 shows the processor 602 as a single box, it should be understood that the processor 602 may represent a plurality of processing cores, each of which can perform separate processing. The processor 602 may also include special purpose logic devices (i.e., application specific integrated circuits (ASICs)) or configurable logic devices (i.e., simple programmable logic devices (SPLDs), complex programmable logic devices (CPLDs), and field programmable gate arrays (FPGAs)), that, in addition to microprocessors and digital signal processors may individually, or collectively, are types of processing circuitry.

The processor 602 performs a portion or all of the processing steps required to execute the techniques presented herein, e.g., in response to instructions received at network processor unit(s) 610 and/or instructions contained in memory 604 and/or memory 606. Such instructions may be read into memory 604 and/or memory 606 from another computer readable medium. One or more processors in a multi-processing arrangement may also be employed to execute the sequences of instructions contained in memory 604 and/or memory 606. In alternative embodiments, hard-wired circuitry may be used in place of or in combination with software instructions. Thus, embodiments are not limited to any specific combination of hardware circuitry and software. Put another way, the computing device 600 includes at least one computer readable medium or memory for holding instructions programmed according to the embodiments presented, for containing data structures, tables, records, or other data described that might be required to execute the techniques presented herein.

Still referring to FIG. 6, the network processor unit(s) 610 provides a two-way data communication coupling to a network, such as a local area network (LAN) or the Internet. The two-way data communication coupling provided by the network processor unit(s) 610 can be wired (e.g., via I/O interface(s) 612) or wireless. Meanwhile, I/O interface(s) 614 may allow for input and output of data with other devices that may be connected to computer device 600. For example, I/O interface 614 may provide a connection to external devices such as a keyboard, keypad, a touch screen, and/or some other suitable input device. External devices can also include portable computer readable storage media such as database systems, thumb drives, portable optical or magnetic disks, and memory cards.

While this application has described the techniques presented herein in detail and with reference to specific embodiments thereof, it is nevertheless not intended to be limited to the details shown, since it will be apparent that various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Finally, it is intended that the present invention cover the modifications and variations of this invention that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Similarly, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially". Finally, for the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

What is claimed is:

1. A method of plasma piercing using a plasma cutting torch, the method comprising:

initiating an arc in the plasma cutting torch;

providing the plasma cutting torch at a first pierce height above a workpiece to initiate a piercing operation at the first pierce height for a first duration, the plasma cutting torch staying at or below the first pierce height during the first duration;

during the piercing operation, lowering the plasma cutting torch to a second pierce height above the workpiece for a second duration, the plasma cutting torch staying at or below the second pierce height during the second duration;

completing the piercing operation without subsequently raising the plasma cutting torch above the second pierce height; and lowering the plasma cutting torch to a cut height.

2. The method of claim 1, wherein the plasma cutting torch remains ignited during transition from the first pierce height to the second pierce height.

3. The method of claim 1, further comprising:

prior to lowering the plasma cutting torch to the cut height, lowering the plasma cutting torch to one or more additional pierce heights for one or more additional durations.

4. The method of claim 1, wherein one or more arc process parameters are adjusted at the first pierce height, at the second pierce height, or at the first pierce height and the second pierce height, the one or more arc process parameters including a shield fluid parameter and a plasma gas parameter.

5. The method of claim 1, wherein one or more arc process parameters are adjusted during transition between the first pierce height and the second pierce height, the one or more arc process parameters including a shield fluid parameter and a plasma gas parameter.

6. The method of claim 1, wherein one or more arc process parameters are adjusted at or proximate to a transition from the second pierce height to the cut height, the one or more arc process parameters including a shield fluid parameter and a plasma gas parameter.

7. The method of claim 6, wherein an adjustment of the shield fluid parameter at or proximate to the transition from the second pierce height to the cut height comprises transitioning a composition of a shield fluid from liquid to gas.

8. The method of claim 1, wherein the plasma cutting torch is moved horizontally with respect to the workpiece during one or more of: the piercing operation at the first pierce height, and the piercing operation at the second pierce height.

9. An apparatus comprising:

one or more computer processors;

one or more computer readable storage media; and program instructions stored on the one or more computer readable storage media for execution by at least one of the one or more computer processors, the program instructions comprising instructions to:

initiate an arc in a plasma cutting torch;

provide the plasma cutting torch at a first pierce height above a workpiece to initiate a piercing operation at the first pierce height for a first duration, the plasma cutting torch stays at or below the first pierce height during the first duration;

during the piercing operation, lower the plasma cutting torch to a second pierce height above the workpiece for a second duration, the plasma cutting torch stays at or below the second pierce height during the second duration;

complete the piercing operation without subsequently raising the plasma cutting torch above the second pierce height; and lower the plasma cutting torch to a cut height.

10. The apparatus of claim 9, wherein the plasma cutting torch remains ignited during transition from the first pierce height to the second pierce height.

11. The apparatus of claim 9, the program instructions further comprising instructions to:

prior to lowering the plasma cutting torch to the cut height, lower the plasma cutting torch to one or more additional pierce heights for one or more additional durations.

12. The apparatus of claim 9, wherein one or more arc process parameters are adjusted at the first pierce height, at the second pierce height, or at the first pierce height and the second pierce height, the one or more arc process parameters including a shield fluid parameter and a plasma gas parameter.

13. The apparatus of claim 9, wherein one or more arc process parameters are adjusted during transition between the first pierce height and the second pierce height, the one or more arc process parameters including a shield fluid parameter and a plasma gas parameter.

14. The apparatus of claim 9, wherein one or more arc process parameters are adjusted at or proximate to a transition from the second pierce height to the cut height, the one or more arc process parameters including a shield fluid parameter and a plasma gas parameter.

15. The apparatus of claim 14, wherein an adjustment of the shield fluid parameter at or proximate to the transition from the second pierce height to the cut height comprises transitioning a composition of a shield fluid from liquid to gas.

16. The apparatus of claim 9, wherein the plasma cutting torch is moved horizontally with respect to the workpiece during one or more of: the piercing operation at the first pierce height, and the piercing operation at the second pierce height.

17. A computer program product comprising one or more computer readable storage media collectively having program instructions embodied therewith, the program instructions executable by a computer to cause the computer to:

initiate an arc in a plasma cutting torch;

provide the plasma cutting torch at a first pierce height above a workpiece to initiate a piercing operation at the first pierce height for a first duration, the plasma cutting torch stays at or below the first pierce height during the first duration;

during the piercing operation, lower the plasma cutting torch to a second pierce height above the workpiece for a second duration, the plasma cutting torch stays at or below the second pierce height during the second duration;

complete the piercing operation without subsequently raising the plasma cutting torch above the second pierce height; and lower the plasma cutting torch to a cut height.

18. The computer program product of claim 17, wherein the plasma cutting torch remains ignited during transition from the first pierce height to the second pierce height.

19. The computer program product of claim 17, wherein the program instructions further cause the computer to:

prior to lowering the plasma cutting torch to the cut height, lower the plasma cutting torch to one or more additional pierce heights for one or more additional durations.

20. The computer program product of claim 17 wherein one or more arc process parameters are adjusted at the first pierce height, at the second pierce height, or at the first pierce height and the second pierce height, the one or more arc process parameters including a shield fluid parameter and a plasma gas parameter.

\* \* \* \* \*